United States Patent [19]

Santandrea et al.

[11] Patent Number: 5,316,228
[45] Date of Patent: * May 31, 1994

[54] MACHINE FOR WINDING TWO-POLE STATORS

[75] Inventors: Luciano Santandrea; Massimo Lombardi, both of Florence, Italy

[73] Assignee: Axis S.p.A., Florence, Italy

[ * ] Notice: The portion of the term of this patent subsequent to Nov. 13, 2007 has been disclaimed.

[21] Appl. No.: 911,126

[22] Filed: Jul. 9, 1992

Related U.S. Application Data

[60] Continuation of Ser. No. 579,606, Sep. 10, 1990, Pat. No. 5,149,000, which is a division of Ser. No. 306,618, Feb. 6, 1989, Pat. No. 4,969,606.

Foreign Application Priority Data

Mar. 10, 1988 [IT] Italy .................. 67196 A/88

[51] Int. Cl.$^5$ ............................................. H02K 15/02
[52] U.S. Cl. ................................ 242/1.1 R; 29/596; 29/605
[58] Field of Search .............. 242/1.1 R, 1.1 A, 1.1 E; 29/596, 605

[56] References Cited

U.S. PATENT DOCUMENTS

| | | | |
|---|---|---|---|
| 3,648,938 | 3/1972 | Dryburgh | 242/1.1 R |
| 4,000,764 | 1/1977 | Reiger, Jr. | 140/113 |
| 4,483,433 | 11/1984 | Fischer et al. | 198/339 |
| 4,679,312 | 7/1987 | Nussbaumer et al. | 29/596 |
| 4,713,883 | 12/1987 | Santandrea et al. | 29/736 |
| 4,732,338 | 3/1988 | Eminger et al. | 242/1.1 R |
| 4,969,606 | 11/1990 | Santandrea | 242/1.1 R |
| 5,149,000 | 9/1992 | Santandrea | 242/1.1 R |

FOREIGN PATENT DOCUMENTS 2091668A 8/1982 United Kingdom .

*Primary Examiner*—Katherine Matecki
*Attorney, Agent, or Firm*—Robert R. Jackson

[57] ABSTRACT

A machine for winding two-pole stators includes a revolving table around which are located at least three working stations: a station to feed the machine with unwound stators from a conveyor placed alongside the machine and for returning the wound stators to the conveyor; a winding station where one or more winding needles with alternating translatory and angular motion wind the stator; and a terminating station with means to anchor the coil leads to the stator. The revolving table carries a plurality of circumferentially spaced stator housings, each stator housing having stator-containing means. The stator housings and table are equipped with mechanical, reciprocally meshing means, those on the table being located between the winding station and the load/unload station for rotating the stator housings about the horizontal axis tangentially to the table between a position in which the axis of the stator-containing means is vertical and a position in which that axis is horizontal. The stator housings further include a spring to keep the axis of the associated stator-containing means horizontal during movement of the housings from the load/unload station through the winding station to the terminating station.

55 Claims, 9 Drawing Sheets

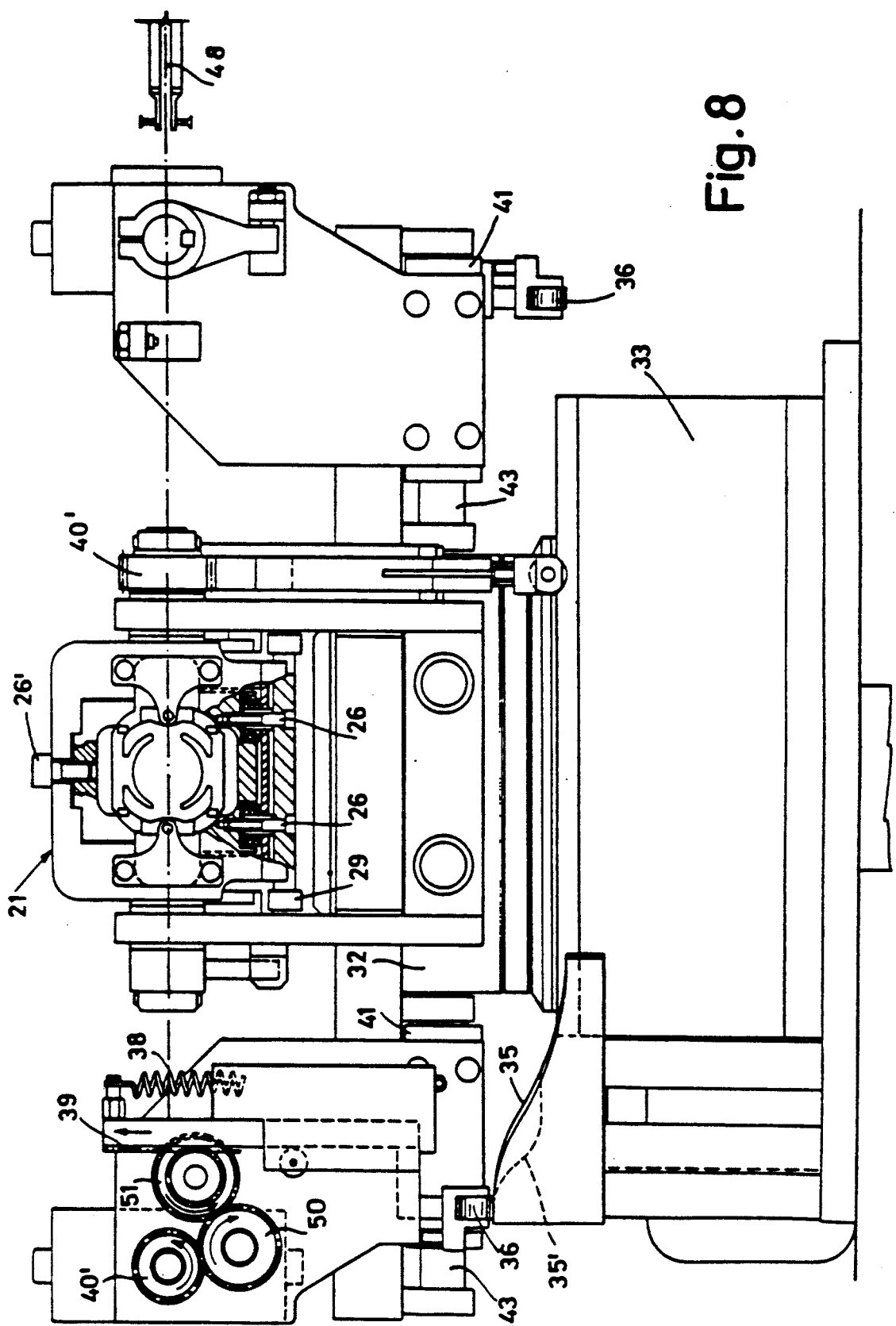

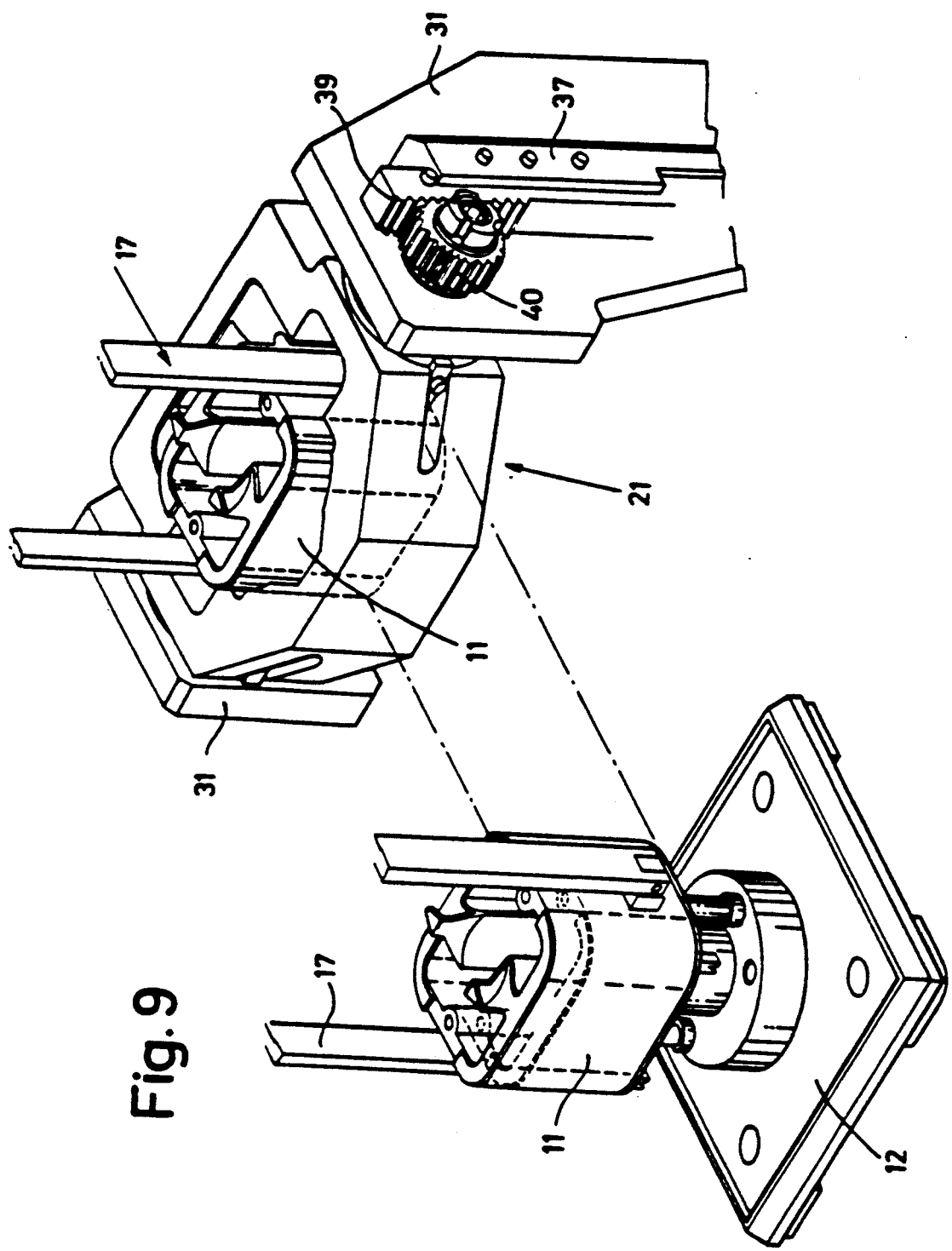

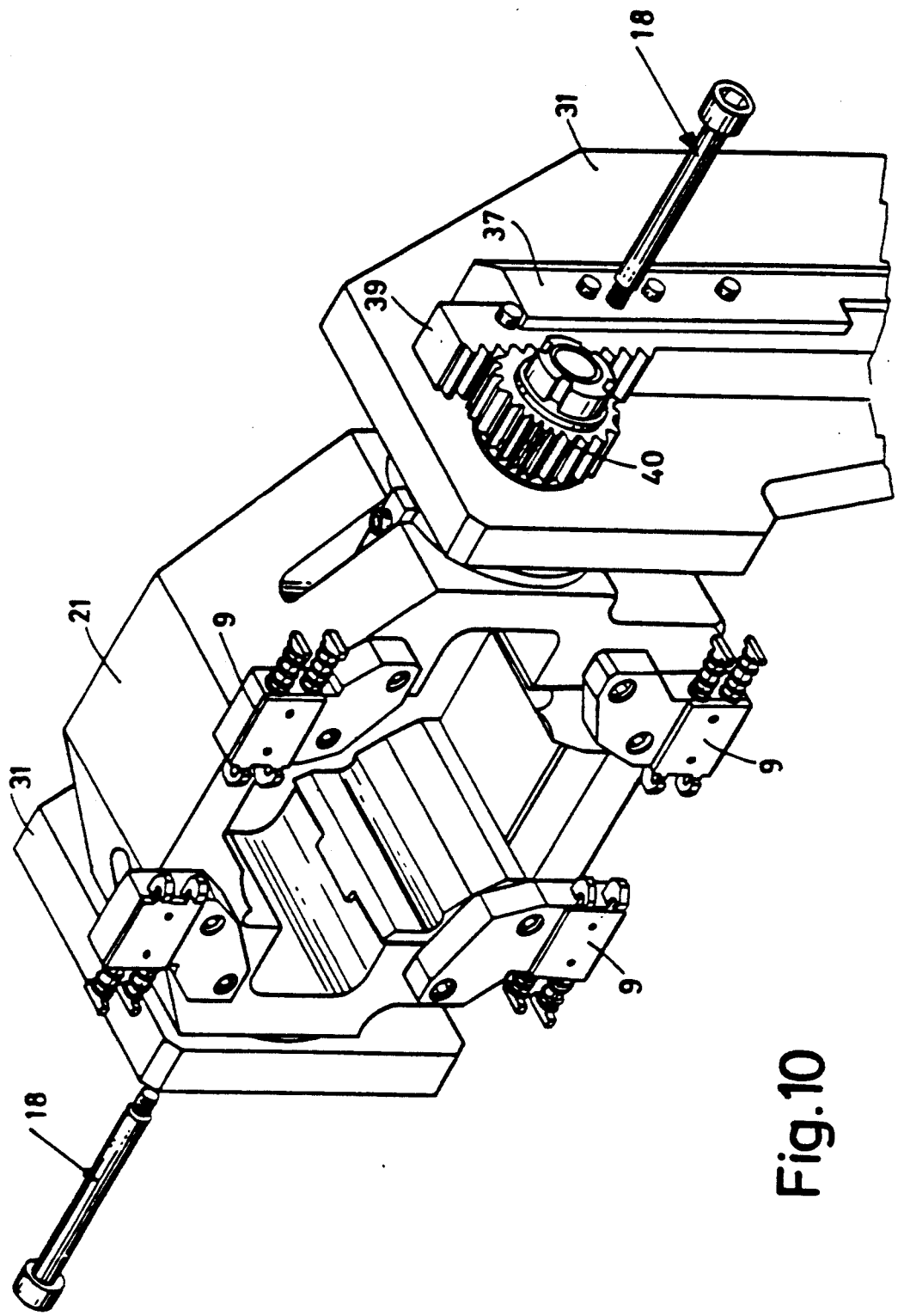

MACHINE FOR WINDING TWO-POLE STATORS

This is a continuation of U.S. application Ser. No. 07/579,606, filed Sep. 10, 1990 (now U.S. Pat. No. 5,149,000), which was a division of U.S. application Ser. No. 07/306,618, filed Feb. 6, 1989 (now U.S. Pat. No. 4,969,606).

BACKGROUND OF THE INVENTION

This invention relates to machines for winding two-pole stators for electric motors. In particular, the invention relates to machines for winding two-pole stators which do not employ wire-guiding winding forms, thereby permitting changeover from one stator type to another with a minimum of work.

It is an object of this invention to provide a machine fed from a conveyor system for completely automated winding of stators within a very short cycle time.

It is another object of this invention to provide a very reliable and flexible machine, i.e., a machine able to wind stators of various stack diameters and stack heights.

These and other objects of the invention are accomplished by providing a two-pole stator winding machine including a table mounted on a base for rotation about a vertical axis. Spaced from one another around the table are at least three working stations. These are (1) a station for feeding the machine with unwound stators from a conveyor placed alongside the machine and for subsequently returning the wound stators to said conveyor; (2) a winding station where one or more winding needles with alternating translatory and angular motion provide for winding each stator; and (3) a terminating station including means for anchoring the coil leads to the stator. The revolving table has stator housings fitted to it at distances related to the distances between the working stations. Each stator housing includes stator-containing means. The stator housings and table are equipped with mechanical, reciprocally meshing means, those on the table being located between the winding station and the load/unload station for rotating the stator housings about their horizontal axis which is tangential to the table between a position in which the axis of the stator-containing means is vertical and a position in which that axis is horizontal. The stator housings further include a spring to keep the housings in the position in which the axis of the associated stator-containing means is horizontal during motion of the table from the load/unload station through the winding station and to the terminating station.

Further features of the invention, its nature and various advantages will be more apparent from the accompanying drawings and the following detailed description of the preferred embodiments.

BRIEF DESCRIPTION OF THE DRAWINGS

FIG. 3 is rotated 180° relative to FIG. 2.

FIG. 4 is taken in the opposite direction from FIG. 1.

FIG. 8 is an alternative embodiment of the table shown in FIG. 4.

FIG. 9 is a perspective view showing a pallet and a stator housing at the load/unload station.

FIG. 10 is a perspective view showing a partially disassembled stator housing.

DETAILED DESCRIPTION OF THE PREFERRED EMBODIMENTS

Figure 1:
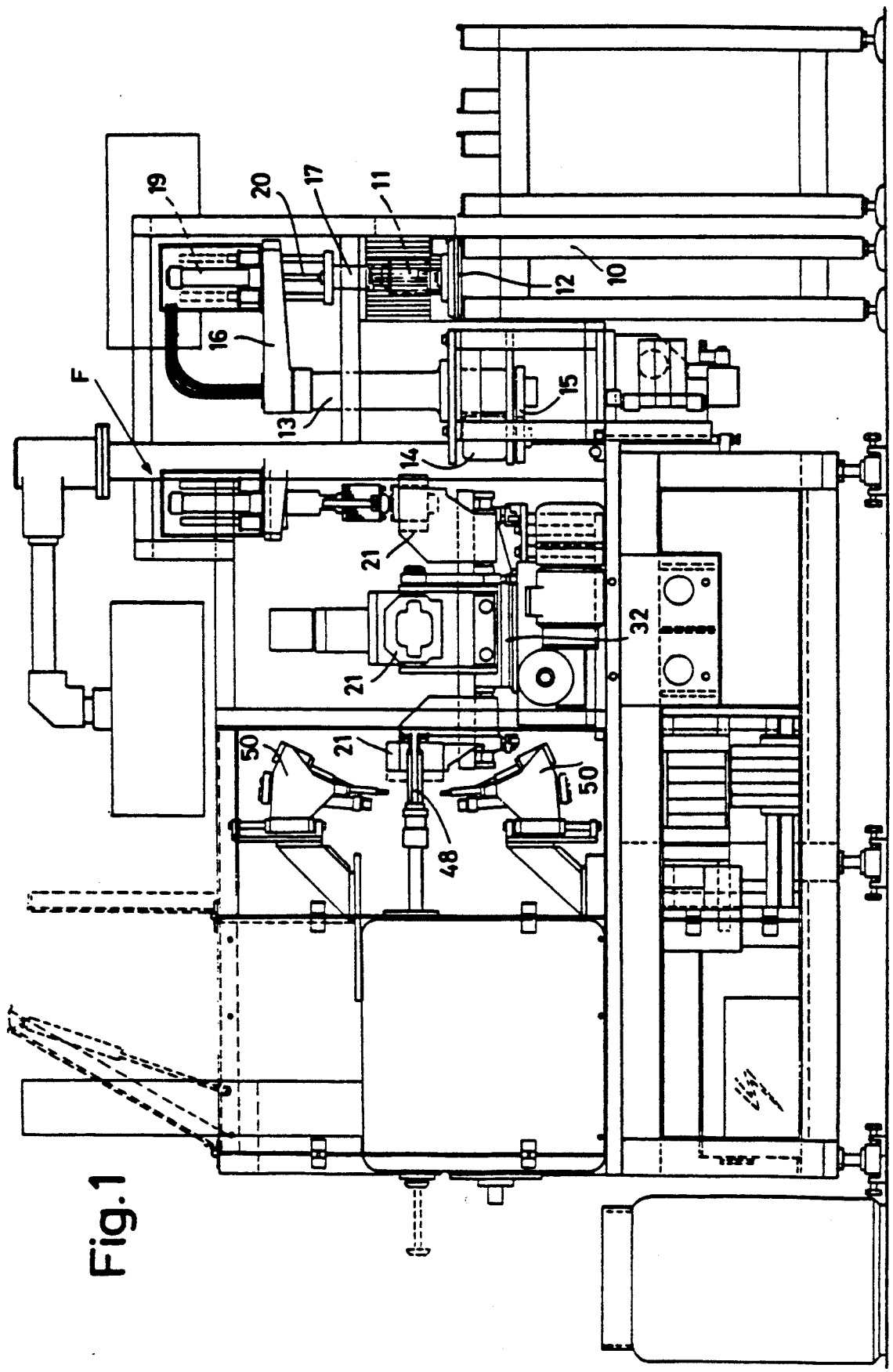
FIG. 1 is a side elevational view of a first embodiment of the invention in which the machine includes only one terminating station.
Figure 2:
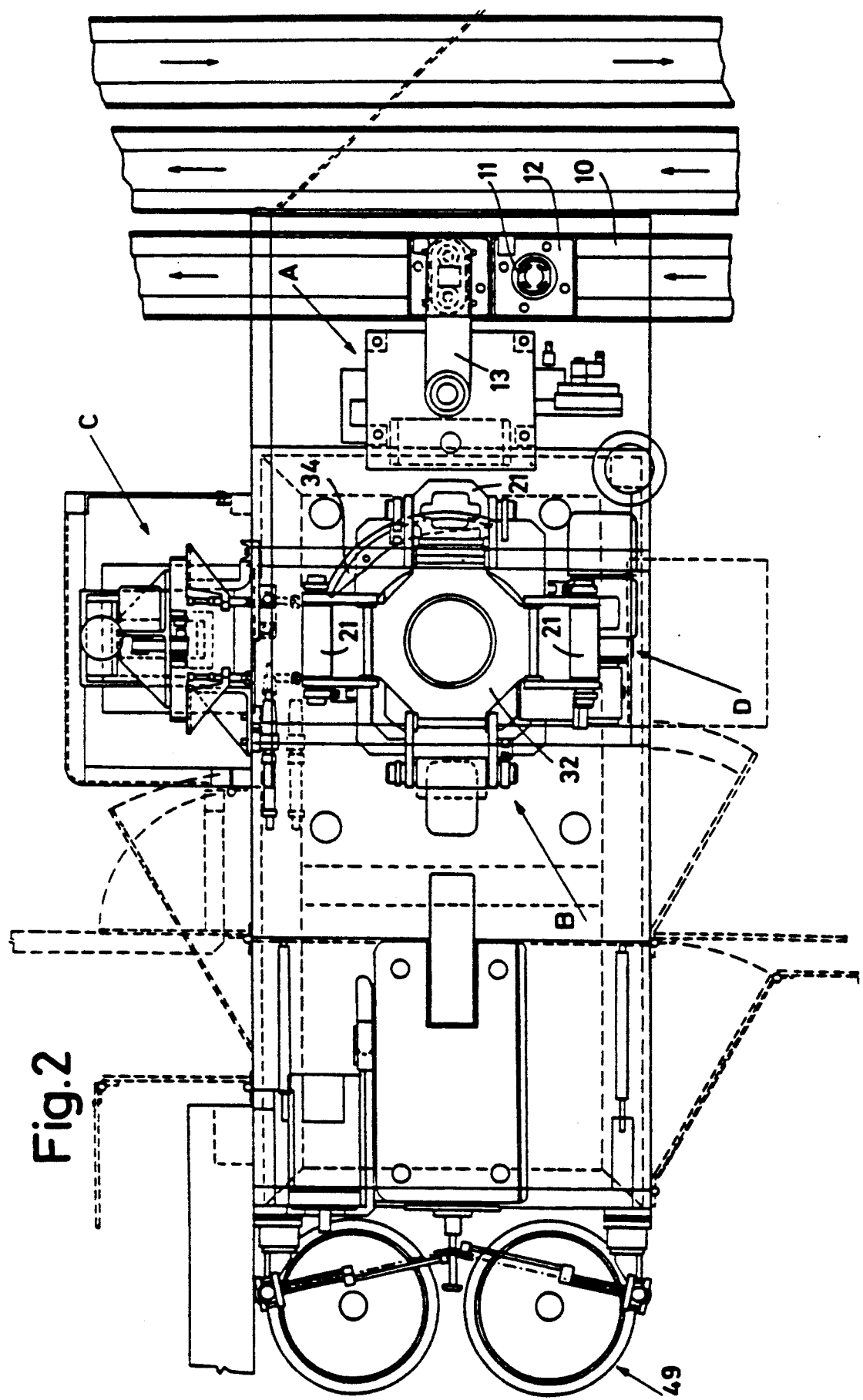
FIG. 2 is a top view of the machine of FIG. 1.

As shown in FIGS. 1 and 2, a transport system 10 located at one side of the machine carries stators 11 on pallets 12. Next to conveyor 10 is a first working station indicated at A in FIG. 2. Station A is a load/unload station including a column 13 rotatable about a vertical axis by means of pneumatic cylinder 14 and gear 15. Column 13 carries arm 16 having a vertically slidable gripper 17. Gripper 17 is moved downward by means of pneumatic cylinder 19 with its shaft 20. After gripping stator 11, gripper 17 moves up. Column 13 then rotates 180° to bring gripper 17 and stator 11 into the position shown by arrow F in FIG. 1.

Figure 3:
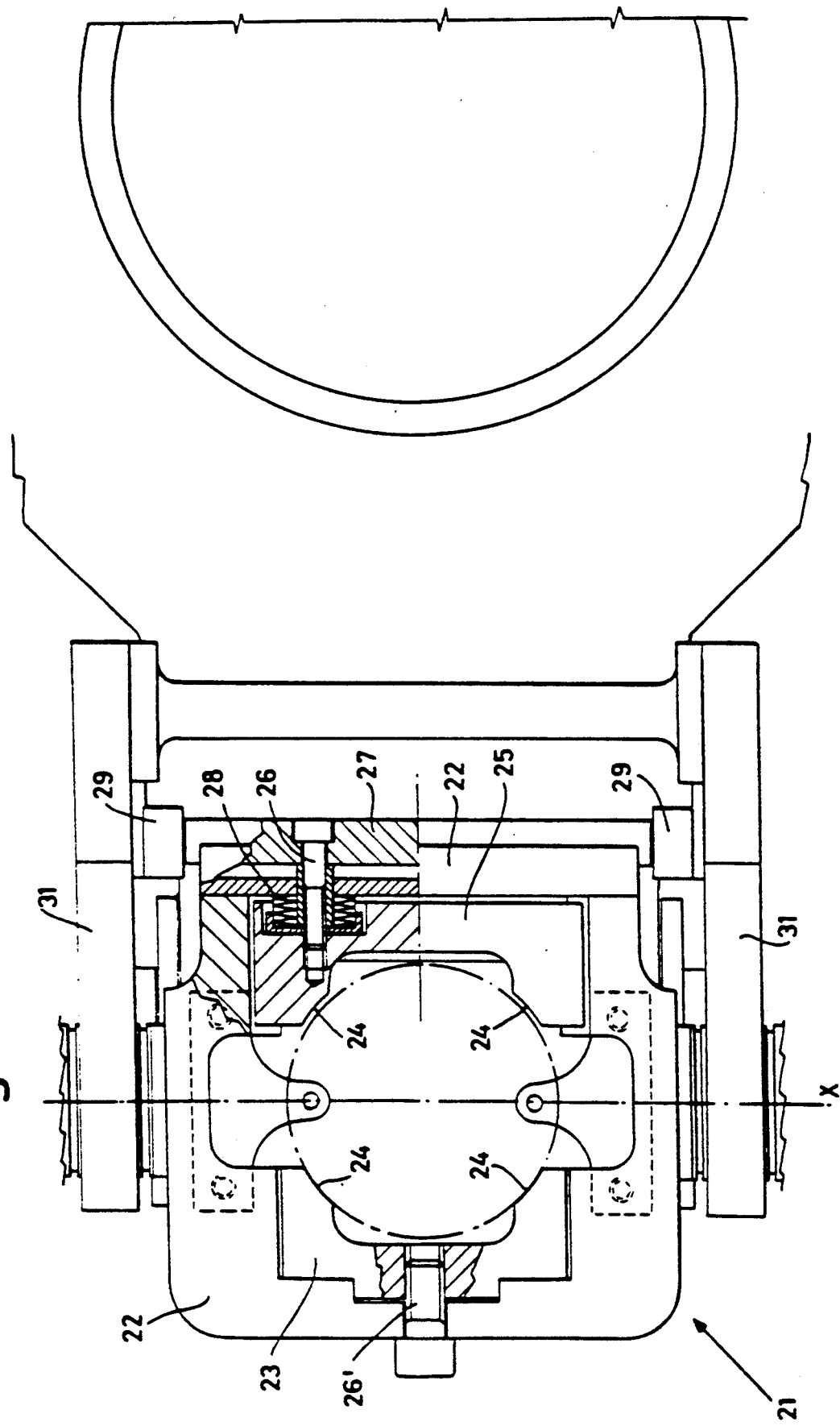
FIG. 3 is a top view, partly in section, of a stator housing fitted to the machine of FIGS. 1 and 2.

A stator housing 21 under gripper 17 (better seen in FIGS. 3 and 4) has an outer body 22. Fixed to one side of outer body 22 by screw 26' is a half-chuck 23 having inner sidewalls 24 defining an arc of a circle for engaging stator 11. On the opposite side, half-chuck 25 is fixed by screw 26 to transverse rod 27. Around screw 26, springs 28 are compressed between outer body 22 and half-chuck 25. By unscrewing screws 26 and 26', half-chucks 23 and 25 can be quickly removed and replaced with others having different inner sidewalls 24 for stators with different stack diameters.

Rod 27 ends in rollers 29 slidable along surfaces 30 (FIG. 5) formed as circular arcs. The axis of arcs 30 is parallel to but not coincident with the pivotal axis X by which housing 21 is pivotally mounted to support 31.

As shown in FIG. 10, each stator housing 21 can be rapidly removed and replaced by unscrewing just two screws 18 and pulling the housing up and out. This operation may be necessary when the stators to be wound require different lead holding claws 9. In such cases, removal and replacement of both half-chucks and of claws 9 would take more time than replacing the whole stator housing 21 by unscrewing two screws 18.

Supports 31 are connected to rotatable table 32 carrying four stator housings 21 identical to the one previously described. Housings 21 are located 90° apart on table 32, and the table is fitted to a thrust bearing and indexed through 90° at each step, driven by conventional motor means (not illustrated).

The stationary base 33 (FIG. 4) of table 32 carries a vertical circular curved plate 34 for a portion of its circumference between load/unload station A and the last working station (FIG. 2). Plate 34 has a curvilinear upper surface 35 with its section increasing toward the load/unload station. Surface 35 is the running surface of roller 36 fixed to bar 37, which in turn is vertically slidable and pushed downwards by spring 38.

Bar 37 carries rack 39 which engages gear wheel 40 integral with the pivot pin of the axis X about which stator housing 21 is pivotable. In this way, when roller 36 runs along surface 35, the associated stator housing 21 rotates from the position shown in the center and on the right side of FIG. 4 (in which the stator is held with its axis horizontal) to the position shown on the left side of FIG. 4 (in which the stator is carried with its axis vertical) to facilitate loading and unloading of stators 11 in housings 21 by gripper 17. FIG. 9 shows that, with stator housing 21 turned with its axis vertical and with the gripper arms vertical, gripper 17 is able to transfer stators with different stack heights between pallet 12 and stator housing 21 without the need to adjust either the gripper or the housing. Another advantage is that stator 11 reaches its proper position on pallet 12 and inside stator housing 21 by gravity, without the need to adjust any of the apparatus, thereby reducing production costs.

Figure 4:
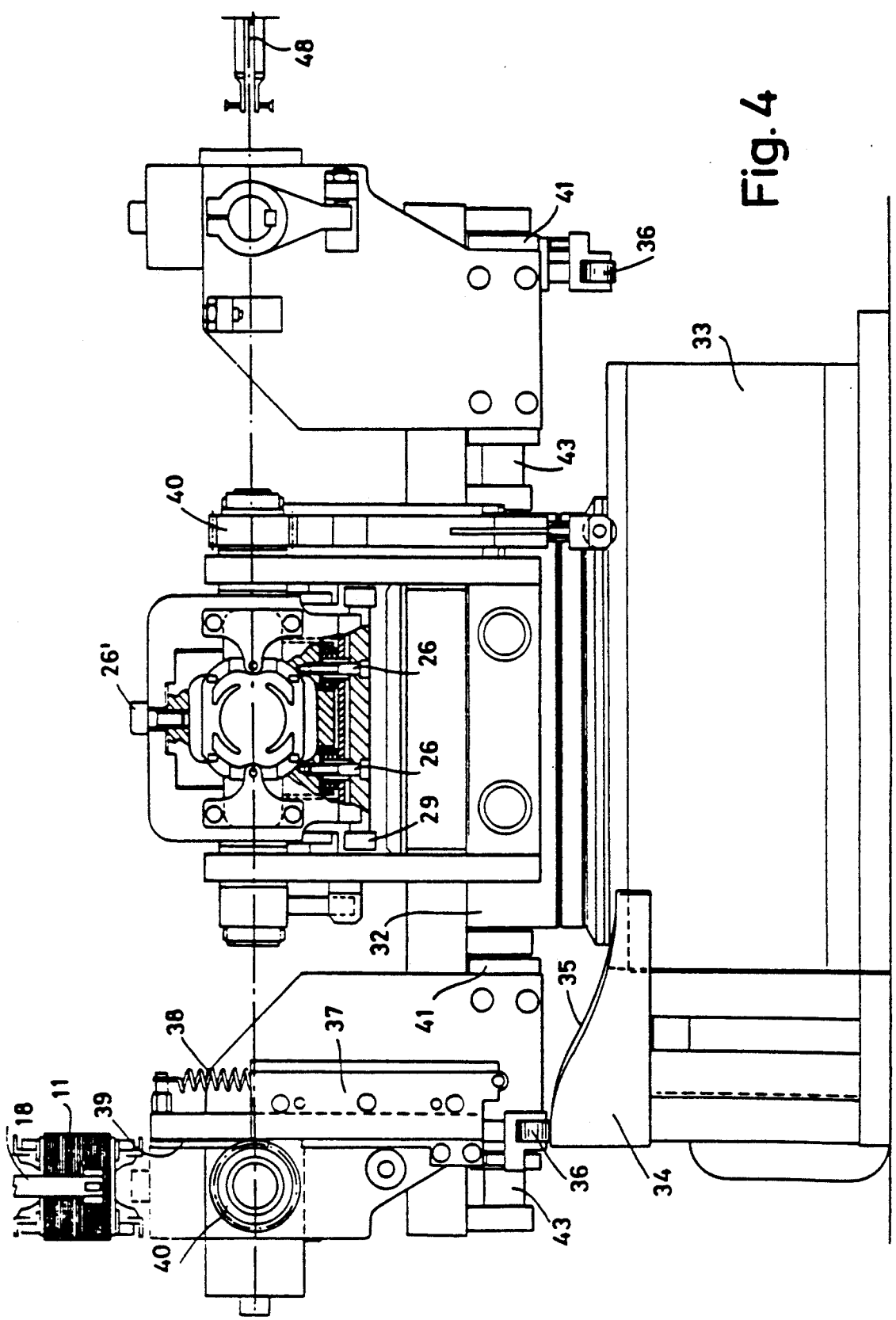
FIG. 4 is a front view of the revolving table of the machine of FIGS. 1 and 2, including the stator housings shown in FIG. 3.
Figure 5:
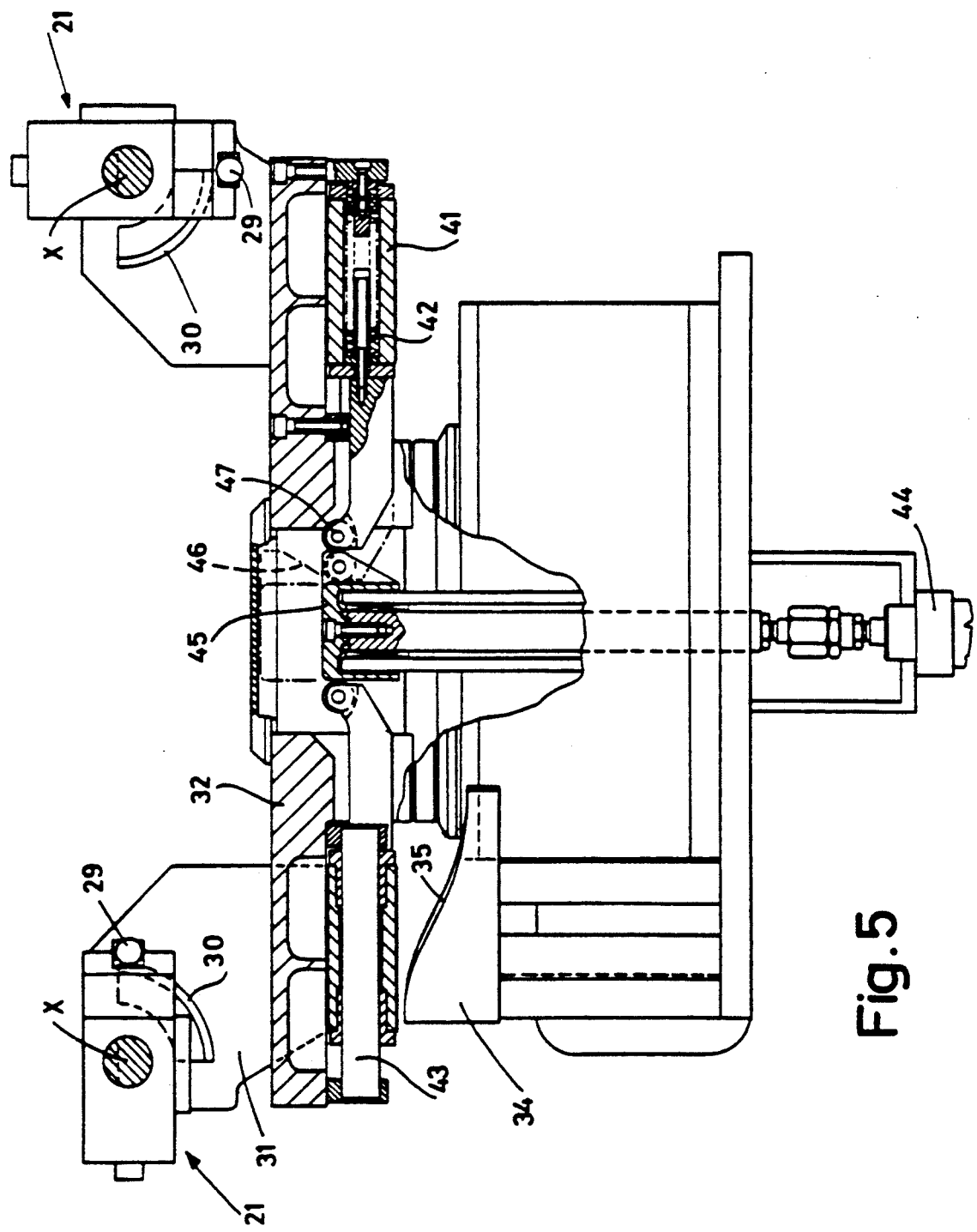
FIG. 5 is a partly sectional front view of the table of FIG. 4.

As shown in FIGS. 4 and 5, the supports 31 of each stator housing 21 are fixed to sliders 41 which move on radial rods 43. Springs 42 maintain supports 31 toward the central vertical rotation axis of table 32. Cylinder 44, having the same axis as the rotation axis of table 32, carries a rod 45 on the end of which is fixed an appendage that has an inclined sidewall 46 (FIG. 5) projecting at the side opposite to the load/unload station. After each 90° indexing of table 32, cylinder 44 retracts rod 45 so that inclined surface 46 goes from the position shown in dashed lines in FIG. 5 to the position shown in full lines, thereby pushing the slider 41 associated with the stator housing 21 adjacent winding station B away from the center of table 32 as roller 47 slides along inclined surface 46. In this way, as shown in FIGS. 1 and 2, the stator housing adjacent winding station B is pushed toward winding station B where one or more winding needles 48 wind stator 11 inside stator housing 21.

The kinematic system 49 (FIG. 2) moving needles 48 will not be explained in detail here, nor will the cutting means 50 (FIG. 1) which cut off the leads after winding, because the details of these elements do not concern the present invention.

Terminating station C (FIG. 2), where the coil leads are anchored to the stator, is situated between winding station B and load/unload station A, with the revolving table 32 indexing clockwise. Terminating station C has a terminating group moving along three axes, controlled by a step motor or a D.C. motor with encoder. The group has wire gripping means for catching the coil lead and putting it into the stator terminal. The gripping means are combined with crimping means for completing termination of the stator. Again, this station will not be described in detail because it does not concern the present invention.

As explained above, the machine includes a first station A for loading and unloading, with gripper 17 on column 13 which transfers stator 11 between the conveyor system and the stator housing with its half-chucks 23 and 25, said housing in said station having its axis vertical.

The stator inside stator housing 21 arrives at a second station D, which in the embodiment illustrated in FIG. 2 is a waiting or intermediate station, after a 90° rotation about its axis X, so that stator 11 (held by half-chucks 23 and 25) arrives with its axis horizontal. The half-chucks firmly grip stator 11, because from the moment when the stator housing starts to rotate about axis X, rollers 29 running on curved surface 30 release the force opposing the operation of springs 28 so that these springs can push half-chuck 25 toward half-chuck 23, thereby locking the stator inside the housing. The above-described rotation of housing 21 starts as soon as table 32 revolves clockwise and roller 36 leaves cam surface 35. Spring 38 then pushes sliding bar 37 downward, so that rack 39 rotates gear wheel 40 which is also the pivoting point of housing 21.

After another 90° indexing of revolving table 32, the stator housing 21 with the stator to be wound arrives at winding station B. Cylinder 44 then retracts its rod so that inclined sidewall 46 pushes slider 41 (together with housing 21) outward, thereby bringing the stator near the winding needles which now start winding the stator.

After the coils have been wound, revolving table 32 again indexes through 90°, bringing the stator inside the housing to terminating station C where the coil leads are anchored to the stator terminals.

A further 90° indexing of revolving table 32 brings the stator back to load/unload station A. Gripper 17 is pivoted over the stator, descends, grips the stator, and unloads it onto conveyer 10. During this last indexing of the table, roller 36, running along surface 35, had moved sliding bar 37 upwards. Rack 39 rotates gear wheel 40 so that housing 21 arrives at the load/unload station with the stator axis vertical. At the same time, rollers 29, running along surfaces 30, cause half-chuck 25 to be moved outward, unlocking stator 11.

Figure 6A:
Figure 6:
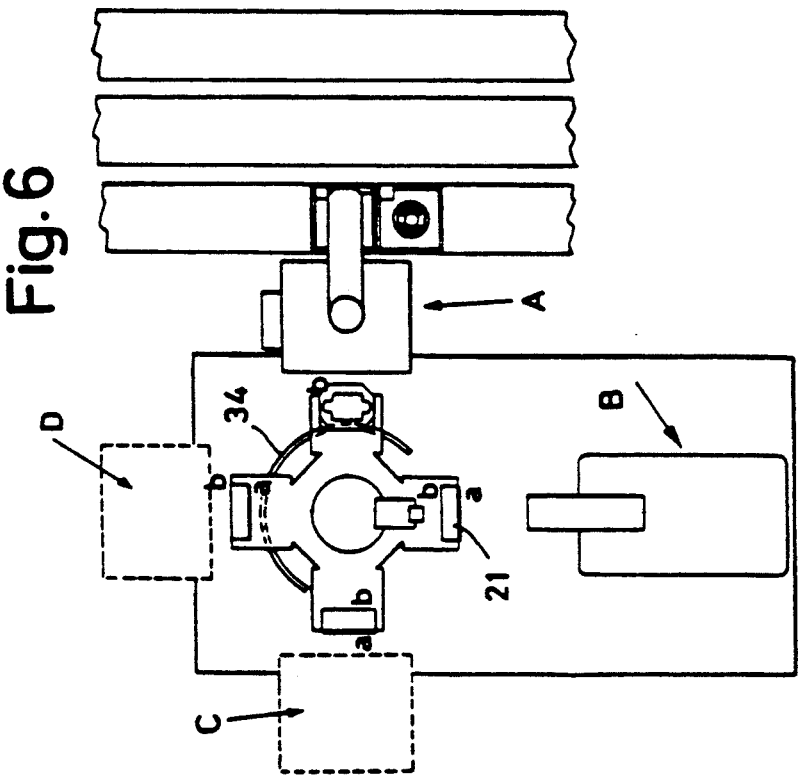

An alternative embodiment is shown in FIG. 6 in which load/unload station A and winding station B are adjacent to one another, followed by two terminating stations C and D. This arrangement can be especially advantageous for stators with intermediate taps which require two successive terminating operations on the same stator.

FIGS. 6 and 6a concern a first embodiment as described above in which the stator leaves winding station B with the coil leads held by claws 9 (FIG. 10) on stator housing 21. After a 90° indexing of revolving table 32, the wound stator arrives at the first terminating station C where the coil leads coming from stator face a are taken out of the claws and terminated on the stator. Then the revolving table 32 indexes again through 90° and brings the stator from terminating station C to the second terminating station D. Roller 36 runs over a first section 35 (FIG. 6a) of cam 34 similar to the one shown in FIG. 4. However, in this embodiment, gear wheel 40' (FIG. 8), acting as the pivoting point of housing 21, instead of directly engaging rack 39 does so by way of gear wheels 50 and 51. As a result of this gear transmission, the housing 21 rotates through 180° on its way from the first to the second terminating stations, where the leads on stator face b are terminated.

After operation of second terminating station D, revolving table 32 indexes again through 90° to bring the stator from the second terminating station to load/unload station A. During this last indexing, roller 36 runs over the second section 35' of cam 34 (FIG. 6a). Gear wheels 40', 50, and 51 rotate the stator housing through 90°, so that the stator arrives at the load/unload station with its axis vertical.

Figure 7A:
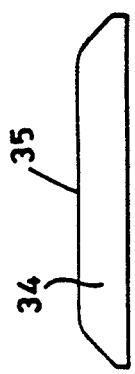
FIGS. 6a and 7a are surface developments of two details of FIGS. 6 and 7, respectively.
Figure 7:
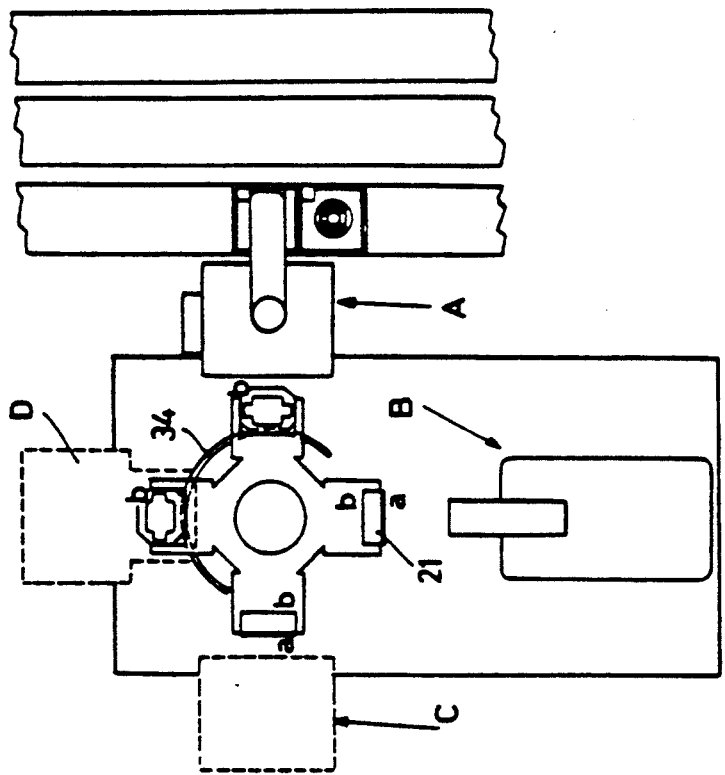
FIGS. 6 and 7 are plan view layouts of two different embodiments of the machine.

Another embodiment with two terminating stations is shown in FIG. 7. After terminating coil leads on stator face a at terminating station C, revolving table 32 indexes through 90° and brings the stator housing to terminating station D. In this embodiment the stator housing 21 is the same as shown in FIG. 4, with rack 39 engaging only one gear wheel 40. As shown in FIG. 7a cam 34 permits only a 90° rotation of the stator housing, presenting stator face b, with the stator axis vertical at terminating station D, and maintaining that orientation of the stator housing through load/unload station A. The terminating group of station D is accordingly located above the stator housing and carries out the same operations for anchoring the leads to stator face b as at station C. After termination at station D, the revolving table indexes again through 90° and brings the stator to load/unload station A with the stator axis still vertical.

The advantage of the embodiment shown in FIG. 7 as compared to the embodiment shown in FIG. 6 is that it reduces machine dimensions at station D.

We claim:

1. Stator processing apparatus comprising:
   a table member mounted for rotation in a substantially horizontal plane about a substantially vertical axis;
   a plurality of stator holders mounted on said table member, said stator holders being angularly spaced from one another about said substantially vertical axis, each of said stator holders including first and second jaw members movable relative to one another so that a stator can be releasably held between said jaw members; and
   first, second, and third work stations disposed adjacent to said table, said work stations being angularly spaced from one another about said substantially vertical axis so that by rotation of said table about said substantially vertical axis, each of said stator holders can be successively disposed adjacent said first, second, and third work stations, said first work station including means for placing a stator in a stator holder disposed adjacent said first work station, said second work station including means for winding at least one coil of wire having at least one coil lead on a stator in a stator holder disposed adjacent said second work station, and said third work station including means for anchoring to a stator in a stator holder disposed adjacent said third work station the coil lead of the coil wound on that stator.

2. The apparatus defined in claim 1 wherein each stator has a longitudinal axis, and wherein each stator holder holds a stator with its longitudinal axis substantially horizontal when said stator holder is adjacent said second work station.

3. The apparatus defined in claim 2 wherein each stator holder holds a stator with its longitudinal axis at least approximately intercepting said substantially vertical axis when said stator holder is adjacent said second work station.

4. The apparatus defined in claim 1 wherein said means for placing includes means for removing a stator from a stator holder disposed adjacent said first work station prior to operation of said means for placing to place a stator in that stator holder.

5. The apparatus defined in claim 1 wherein each of said stator holders comprises:
   means for resiliently urging said first and second jaw members toward one another in order to hold a stator.

6. The apparatus defined in claim 5 wherein said apparatus further comprises:
   means disposed adjacent said first work station for selectively moving said first and second jaw members of a stator holder disposed adjacent said first work station away from one another by overriding the operation of said means for resiliently urging in order to release a stator.

7. The apparatus defined in claim 6 wherein each of said stator holders comprises:
   a jaw support structure on which said first and second jaw members are mounted.

8. The apparatus defined in claim 7 wherein each of said jaw support structures is movably mounted on said table member, and wherein said means for moving said first and second jaw members away from one another is responsive to movement of a jaw support structure relative to said table member.

9. The apparatus defined in claim 1 further comprising:
   means for producing relative motion between said second work station and a stator holder disposed adjacent said second work station, said relative motion being parallel to a substantially horizontal axis which passes through that stator holder and at least approximately intercepts said substantially vertical axis.

10. The apparatus defined in claim 1 further comprising:
    at least one roller for producing relative motion between said second work station and a stator holder disposed adjacent said second work station, said relative motion being parallel to a substantially horizontal axis which passes through that stator holder and at least approximately intercepts said substantially vertical axis.

11. The apparatus defined in claim 1 wherein each of said stator holders comprises:
    a jaw support structure on which said first and second jaw members are removably mounted.

12. The apparatus defined in claim 1 wherein each of said stator holders comprises:
    an annular member with a hollow interior, said first and second jaw members being disposed in said hollow interior on opposite sides thereof.

13. A machine for winding a plurality of stators each having an associated longitudinal axis, stack diameter and stack height, said machine comprising:
    a table mounted for rotation about a first substantially vertical axis;
    first, second, and third stations spaced from one another around said table, wherein said first station is a winding station;
    means for selectively rotating said table about said first axis so that said table moves relative to said first, second, and third stations;
    a plurality of stator supports spaced around the periphery of said table, each stator support being adapted to receive and hold a stator and having a pair of opposing clamping members for releasably clamping said stator thereto; and
    a roller for providing relative motion between said winding station and a first stator support rotated into position adjacent said winding station.

14. The machine defined in claim 13 wherein said stator supports include a spring for biasing at least one of said clamping members towards said stator for releasably clamping the stator.

15. The machine defined in claim 13 wherein said pair of opposing clamping members are adapted to be replaced so that said machine is adapted to accommodate a plurality of stators having different stack diameters.

16. The machine defined in claim 13 wherein said stator supports hold said stators so that they are wound with their axes substantially horizontal.

17. The machine defined in claim 13 wherein said pair of opposing clamping members can accommodate a stator having a first stator diameter and wherein said pair of opposing clamping members can be removed from said machine and replaced with another pair of opposing clamping members that can accommodate a stator having a second stator diameter different from said first stator diameter.

18. The machine defined in claim 13 having four stator supports equally spaced around the periphery of said table.

19. The machine defined in claim 13 wherein said stator supports can accommodate a plurality of stators having different stack heights without adjusting said stator supports.

20. A machine for winding a plurality of stators each having an associated longitudinal axis, stack diameter and stack height, said machine comprising:
   a table mounted for rotation about a first substantially vertical axis;
   first, second, and third stations spaced from one another around said table, wherein said first station is a winding station having one or more winding needles;
   means for selectively rotating said table about said first axis so that said table moves relative to said first, second, and third stations;
   a plurality of stator supports spaced around the periphery of said table, each stator support being adapted to receive and hold a stator and having a pair of opposing clamping members for releasably clamping said stator thereto; and
   means for providing relative radial motion between said winding station and a first stator support rotated into position adjacent said winding station so as to position said one or more winding needles adjacent said first stator support.

21. The machine defined in claim 20 wherein said pair of opposing clamping members are adapted to be replaced so that said machine is adapted to accommodate a plurality of stators having different stack diameters.

22. The machine defined in claim 20 wherein said stator supports include a spring for biasing at least one of said clamping members towards said stator for releasably clamping the stator.

23. The machine defined in claim 20 wherein said stator supports hold said stators so that they are wound with their axes substantially horizontal.

24. The machine defined in claim 20 wherein said pair of opposing clamping members can accommodate a stator having a first stator diameter and wherein said pair of opposing clamping members can be removed from said machine and replaced with another pair of opposing clamping members that can accommodate a stator having a second stator diameter different from said first stator diameter.

25. The machine defined in claim 20 having four stator supports equally spaced around the periphery of said table.

26. The machine defined in claim 20 wherein said stator supports can accommodate a plurality of stators having different stack heights without adjusting said stator supports.

27. The machine defined in claim 20 wherein said means for providing relative radial motion comprises a means for moving said first stator support radially outward from said first substantially vertical axis towards said winding station.

28. A method for winding a plurality of stators, each having an associated longitudinal axis, stack diameter, and stack height, said method comprising the steps of:
   providing a table mounted for rotation about a first substantially vertical axis;
   providing a first station and a second station spaced from one another around said table, wherein said first station is a stator loading and unloading station and wherein said second station is a stator winding station having one or more winding needles;
   providing a plurality of stator supports spaced around the periphery of said table, each stator support being adapted to receive and hold a stator at said first station and to hold the stator so that it is wound at the winding station with its longitudinal axis oriented substantially horizontal;
   releasably clamping a first stator at the loading and unloading station with a first pair of removable opposing clamping members, said first stator having a first diameter;
   rotating said table so as to position said first stator adjacent said winding station;
   providing relative motion between said rotated first stator and said winding station so as to position said one or more winding needles adjacent said first stator;
   winding said first stator with at least one coil of wire; and
   rotating said table so as to return said wound stator to the load and unload station.

29. The method of claim 28 further comprising the steps of:
   unloading said first stator from said first pair of removable opposing clamping members;
   removing said first pair of removable opposing clamping members from said stator support; and
   replacing said first pair of removable opposing clamping members with a second pair of removable opposing clamping members so as to be able to releasably clamp a second stator at the loading and unloading station, said second stator having a second diameter different from said first diameter.

30. The method defined in claim 29 wherein the first and second stators have different stack heights and wherein substantially no adjustment to said stator supports has to be made in order to accommodate such different stack heights.

31. The method defined in claim 28 wherein said step of releasably clamping said first stator with a first pair of removable clamping members includes the step of biasing at least one of said clamping members towards said first stator for releasably clamping the stator.

32. The method defined in claim 28 wherein said step of providing a plurality of stator supports includes the step of providing four stator supports equally spaced around the periphery of said table.

33. A machine for winding a plurality of stators, each having an associated longitudinal axis, stack diameter, and stack height, said machine comprising:
   a table mounted for rotation about a first substantially vertical axis;
   first, second, and third stations spaced from one another around said table, wherein said first station is a winding station and said second station is a terminating station;
   means for selectively rotating said table about said first axis so that said table moves relative to said first, second, and third stations; and a plurality of stator supports spaced around the periphery of said table, each stator support being adapted to receive and hold a stator and having a pair of opposing clamping members for releasably clamping said stator thereto.

34. The machine defined in claim 33 wherein said second station permanently anchors coil leads to said stators.

35. The machine defined in claim 33 wherein said stator supports include a spring for biasing at least one of said clamping members towards said stator for releasably clamping the stator.

36. The machine defined in claim 33, wherein said pair of opposing clamping members are adapted to be removed so that said machine is adapted to accommodate a plurality of stators having different stack diameters, each of said stator supports further including a plurality of clamps for temporarily anchoring coil leads thereto.

37. The machine defined in claim 33 wherein said stator supports hold said stators so that they are wound with their axes substantially horizontal.

38. The machine defined in claim 33 wherein said pair of opposing clamping members can accommodate a stator having a first stator diameter and wherein said pair of opposing clamping members can be removed from said machine and replaced with another pair of opposing clamping members that can accommodate a stator having a second stator diameter different from said first stator diameter.

39. The machine defined in claim 33 having four stator supports equally spaced around the periphery of said table.

40. The machine defined in claim 33 wherein said stator supports can accommodate a plurality of stators having different stack heights without adjusting said stator supports.

41. A method for winding a plurality of stators, each having an associated longitudinal axis, stack diameter, and stack height, said method comprising the steps of:
providing a table mounted for rotation about a first substantially vertical axis;
providing a first station, a second station, and a third station spaced from one another around said table, wherein said first station is a stator loading and unloading station, said second station is a stator winding station having one or more winding needles, and said third station is a coil lead terminating station;
providing a plurality of stator supports spaced around the periphery of said table, each stator support being adapted to receive and hold a stator at said first station and to hold the stator so that it is wound at the winding station with its longitudinal axis oriented substantially horizontal;
releasably clamping a first stator at the loading and unloading station with a first pair of removable opposing clamping members, said first stator having a first diameter;
rotating said table so as to position said first stator adjacent said winding station;
winding said first stator with at least one coil of wire;
temporarily anchoring coil leads to said stator supports at said winding station;
rotating said table so as to position said wound stator adjacent said terminating station;
permanently anchoring said coil leads to said wound stator at said terminating station; and
rotating said table so as to return said wound and anchored stator to the load and unload station.

42. The method of claim 41 further comprising the steps of:
unloading said first stator from said first pair of removable opposing clamping members;
removing said first pair of removable opposing clamping members from said stator support; and
replacing said first pair of removable opposing clamping members with a second pair of removable opposing clamping members so as to be able to releasably clamp a second stator at the loading and unloading station, said second stator having a second diameter different from said first diameter.

43. The method defined in claim 42 wherein the first and second stators have different stack heights and wherein substantially no adjustment to said stator supports has to be made in order to accommodate such different stack heights.

44. The method defined in claim 41 wherein said step of releasably clamping said first stator with a first pair of removable clamping members includes the step of biasing at least one of said clamping members towards said first stator for releasably clamping the stator.

45. The method defined in claim 41 wherein said step of providing a plurality of stator supports includes the step of providing four stator supports equally spaced around the periphery of said table.

46. A machine for winding a plurality of stators, said machine comprising:
a table mounted for rotation about a first substantially vertical axis;
first, second, and third stations spaced from one another around said table, wherein said first station comprises a load and unload station;
means for selectively rotating said table about said first axis so that said table moves relative to said first, second, and third stations;
a plurality of stator supports spaced around the periphery of said table, each stator support being adapted to receive and hold a stator and having a pair of opposing clamping members for releasably clamping said stator thereto, said clamping members being able to be moved between an unlocked position and a locked position wherein said stator is clamped; and
a stationary actuator located adjacent said load and unload station for moving said clamping members between the unlocked position and locked position so as to allow a stator to be loaded and unloaded from said machine when said clamping members are in the unlocked position.

47. The machine defined in claim 46 wherein said stationary actuator is attached to a stationary base of said machine.

48. The machine defined in claim 47 wherein said stationary actuator provides an actuation force in a substantially vertical direction for moving said clamping members between the locked position and unlocked position.

49. The machine defined in claim 46 wherein said stator supports include a spring for biasing at least one of said clamping members towards said stator for releasably clamping the stator.

50. The machine defined in claim 47 having four stator supports equally spaced around the periphery of said table.

51. The machine defined in claim 46 wherein said stationary actuator comprises a substantially vertical circular curved plate having a curvilinear surface.

52. A method for winding a plurality of stators, each having an associated longitudinal axis, said method comprising the steps of:

providing a table mounted for rotation about a first substantially vertical axis;

providing a first station and a second station spaced from one another around said table, wherein said first station is a stator loading and unloading station and wherein said second station is a stator winding station;

providing a plurality of stator supports spaced around the periphery of said table, each stator support being adapted to receive and hold a stator at said first station and to hold the stator so that it is wound at the winding station with its longitudinal axis oriented substantially horizontal, said plurality of stator supports each including a pair of opposing clamping members for releasably clamping said stators, and said clamping members being able to be moved between an unlocked position and a locked position wherein said stators are clamped;

providing a stationary actuator adjacent said stator load and unload station for moving said clamping members between the unlocked position and locked position so as to allow a stator to be loaded and unloaded from said machine when said clamping members are in the unlocked position;

loading a first stator in a first stator support by actuating said stationary actuator;

rotating said table so that a second stator support is positioned adjacent said stator loading and unloading station;

loading a second stator in said second stator support by actuating said stationary actuator before said first stator is unloaded from said first stator support;

winding said first stator with at least one coil of wire at the winding station;

rotating said table so as to return said wound stator to the stator load and unload station; and unloading the first stator from the first stator support by actuating said stationary actuator.

53. The method defined in claim 52 further comprising the step of providing a third station spaced from said first station and second station around said table, wherein said third station is a termination station.

54. The method defined in claim 52 wherein said step of loading said first stator in a first stator support includes the step of releasably clamping said first stator with a pair of opposing clamping members.

55. The method defined in claim 52 wherein said step of providing a plurality of stator supports includes the step of providing four stator supports equally spaced around the periphery of said table.

* * * * *